United States Patent Office 3,046,316
Patented July 24, 1962

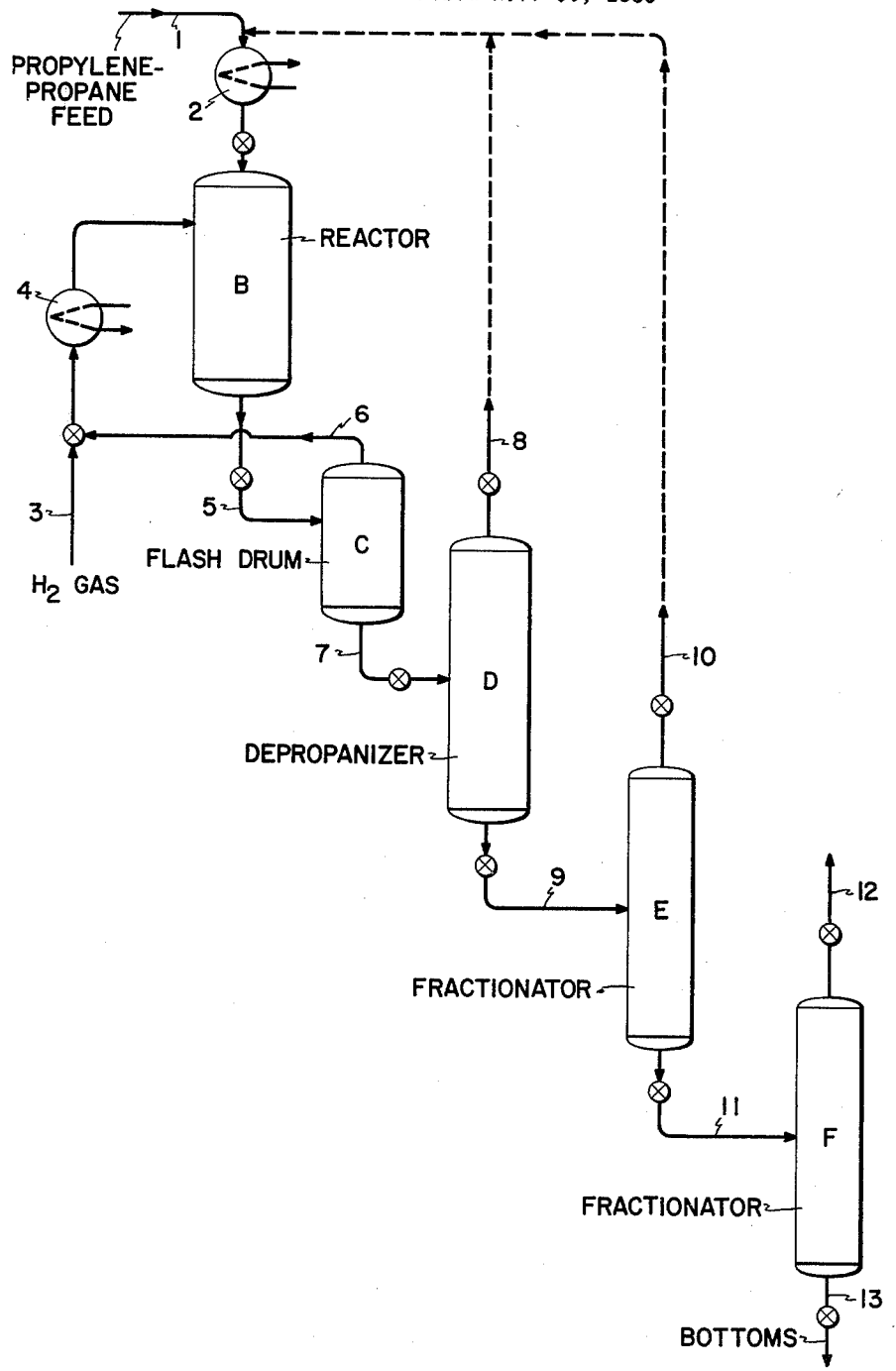

3,046,316
TETRAPROPYLENE QUALITY IMPROVEMENT
David A. Gudelis, Sarnia, Ontario, Canada, assignor to Esso Research and Engineering Company, a corporation of Delaware
Filed Nov. 30, 1959, Ser. No. 856,167
12 Claims. (Cl. 260—671)

This invention relates to the preparation of improved olefin alkylation feeds for use in the preparation of alkyl aryl compounds known as detergent alkylates. In particular, this invention relates to the preparation of superior $C_9$-$C_{24}$, especially $C_{12}$-$C_{15}$, polypropylene alkylation feedstocks and to their use in the alkylation of aromatic hydrocarbons to improve alkylate quality and to reduce catalyst consumption in the alkylation reaction. More particularly, this invention relates to an improved method of polymerization for improving the quality of $C_{12}$ or tetrapropylene rich fractions for use in alkylation reactions with benzene by introducing hydrogen gas to the tetramer producing polymerization reaction.

By tetrapropylene, tetramer, or $C_{12}$ polypropylene fraction is meant a propylene polymer fraction generally boiling in the range of about 340° to 450° F. Such a fraction will usually contain a major proportion of $C_{12}$ polymers with lesser amounts of lower and higher boiling polymers.

This invention preferably comprises the simultaneous introduction of hydrogen and a propylene comprising feedstock to a tetramer producing polymerization reaction to form a superior olefin alkylation feedstock and the preparation of $C_{12}$ alkyl benzene from such feedstock.

The alkyl aryl sulfonates which are built up to form commercial water soluble detergents are themselves prepared by sulfonating alkyl substituted aromatic hydrocarbons. The alkyl substituted aromatics in turn are generally prepared by alkylating an aromatic hydrocarbon with olefin polymers in the presence of a Friedel-Crafts catalyst, e.g. $AlCl_3$. In this alkylation reaction it has been necessary to employ up to 6 to 7 weight percent of $AlCl_3$ based on total tetramer feed. The alkyl benzene is subsequently reacted with sulfuric acid to form a sulfonic acid which is neutralized with caustic to form the sodium alkyl benzene sulfonate. The sulfonate detergent in commercial practice is of course combined with various detergent builders such as sodium sulfate, carboxy methyl cellulose, various sodium phosphates and the like.

The monoolefins employed as feed in the preparation of the alkylate are preferably a tetrapropylene fraction or a $C_{12}$ olefin rich fraction although $C_9$-$C_{24}$ polypropylenes may be used. As feed for the polymerization plant it is preferable to employ a light gaseous olefin which is predominantly propylene and propane. This olefin feed may also include small amounts of butane, ethylene and ethane, i.e. up to a total of about 15 weight percent. However, it is preferred that the feed be free of $C_4$ unsaturates.

Tetramer may be produced as a by-product of gasoline manufacture by fractionation of the polymer product or in a process designed specifically for the production of tetramer in which case the conditions of polymerization are generally milder and designed to maximize $C_{12}$ polypropylene by recycling light polymer boiling below $C_{12}$.

Thus, the polypropylenes are produced in a polymerization plant which comprises a reactor packed with phosphoric acid on kieselguhr or other conventional carriers. Generally the phosphoric acid is present in amounts of 50 to 90 wt. percent calculated as $P_2O_5$. This general process is well known in the art and usually referred to as U.O.P. polymerization. In carrying out a polymerization of this type the propylene feed is passed into the reactor at a rate of about 0.10 to 0.50 gallon per hour per pound of catalyst and the polymerization reactor is maintained at temperatures between 200° and 600° F., preferably 300° to 450° F. and more preferably between 320° to 400° F., and at pressures of 300 to 1000, preferably 500 to 800, p.s.i.g.

A typical polymerization product will comprise tetramer in an amount from 10 to 30 volume percent on total polymer in a single pass process. By recycling lower boiling polymer the yield of $C_{12}$ polymer can be increased to about 90 L.V. percent on the net polymer. The tetramer fraction employed for alkylation is essentially one of choice depending on its effect on the detergent product; however, a typical suitable tetrapropylene fraction which may be employed to produce highly desirable alkyl benzene products will boil in the range of 365°–430° F. at atmospheric pressure.

The polypropylene thus produced is then reacted with benzene or similar aromatics in the presence of $AlCl_3$. One of the most suitable commercial processes comprises the use of $AlCl_3$ in the form of a dispersion or sludge with high molecular weight hydrocarbons. In order to provide a high selectivity to monoalkyl benzene compounds as compared to di- and polyalkylated benzene a high ratio of benzene to olefin feed, e.g. tetrapropylene, is employed. These ratios may be in the range of from 2 to 20:1 of benzene to tetramer.

The alkylated benzene is then fractionated into a light alkylate, heavy alkylate and detergent alkylate. The detergent alkylate may have a boiling range of, for example, about 415° to 610°, preferably 500° to 610°, F., at atmospheric pressure, although this may vary depending on the particular specifications of the various detergent manufacturers.

An important cost factor to the manufacturer of alkylated benzene is the amount of $AlCl_3$ that is required to catalyze the reaction. It is a primary object of this invention to provide an improved polypropylene feedstock for this alkylation reaction so that the amount of alkylation catalyst required is substantially decreased over prior art processes. It is a further object of this invention to provide a process for the preparation of alkyl benzene suitable for detergent manufacture wherein relatively small quantities of alkylation catalyst are required.

It is known that the polypropylenes and especially tetrapropylene fractions employed for the alkylation of benzene may at times contain inhibiting materials which decrease the efficiency of the $AlCl_3$ catalyst to a substantial extent. It has now been found that these inhibiting materials are essentially $C_nH_{2n-2}$, $C_nH_{2n-4}$, $C_nH_{2n-6}$ type polymers which are formed as a result of conjunct polymerization occurring alongside the regular polymerization reaction. It is inherent of the polymerization mechanism that at any given reaction conditons three types of polymerization reactions can occur. The product of the first type which may be termed "true" or "homo-polymerization" consists of olefins which are an integral multiple of the propylene monomer, e.g. $C_6$, $C_9$, $C_{12}$, $C_{15}$, etc. The product of the second type may be called "heteropolymerization" and consists of olefins which are not an integral multiple of the monomer, e.g. $C_7$, $C_8$, $C_{10}$, $C_{11}$, etc. This type of polymerization creates no particular problem. The third type of polymerization can be named "conjunct polymerization." The latter yields a mixture of products consisting of mono-, di-, etc. olefins, paraffins, cycloalkanes, cycloalkenes, cyclodienes, and aromatic hydrocarbons. It is therefore an object of this invention to hold to a minimum the formation of such conjunct polymers, e.g. $C_nH_{2n-2}$ polymers, in tetrapropylene polymerization.

It has now been found that conjunct polymerization with its production of $C_nH_{2n-2}$ polymers is suppressed by introducing hydrogen gas into the polymerization reaction.

More particularly, it has now been found that a superior olefin alkylation feedstock can be prepared by introducing hydrogen at a rate of about 2 to 100, preferably 30 to 70 mole percent, based on propylene in the hydrocarbon feed, into the polymerization reaction maintained at a temperature of about 200° to 600°, preferably 320° to 400° F., and under a pressure in the range of about 300 to 1000 p.s.i.g. By maintaining hydrogen in the reactor in accordance with this invention dehydrogenation reactions during polymerization are repressed. Tetramer thus produced provides an olefin polymer feedstock for alkylation reactions which produces alkyl aryl compounds of outstanding quality and reduces catalyst consumption in the alkylation reaction. The process of this invention eliminates the need for separate treatment of the tetramer such as hydrofining subsequent to polymerization. By controlling the rate of hydrogen input to the polymerization reaction and the conditions of such reaction to inhibit the formation of undesirable unsaturates, e.g. conjunct polymers of the type $C_nH_{2n-2}$, the mono-olefin content of the alkylation feedstock can be raised without the loss of olefin to saturates that is incidental to known processes for hydrofining a polymer fraction. For instance, a small amount, e.g. about 2 to 5 L.V. percent, of the polymers produced in the polymerization of propylene are saturated polymers. It has been found that the introduction of hydrogen gas to the reaction zone in accordance with the process of this invention does not noticeably increase this loss to saturates. On the other hand it has been found that a hydrofining of the unsaturated polymer after polymerization sufficient to convert the $C_nH_{2n-2}$ polymer to $C_nH_{2n}$ polymer results in a loss of unsaturated polymer to saturated polymer in the range of about 15 to 25 L.V. percent. Conjunct polymers of the type $C_nH_{2n-2}$ may be referred to as "hydrogen deficient" polymers. The presence of such polymers in a tetramer fraction may be detected by low voltage mass spectrometry. Under this method, if the ionizing voltage is selected at a relatively low value, only the molecule ions of compounds having an ionization potential at or below the selected voltage are formed and the distribution of $C_nH_{2n}$ and $C_nH_{2n-2}$ compounds determined. See "Low Voltage Techniques in High Molecular Weight Mass Spectrometry," by H. E. Lumpkin, Analytical Chemistry, vol. 30, No. 3, pages 321 to 325, March 1958. With this distribution available it became possible to qualitatively characterize a tetramer fraction as to its content of $C_nH_{2n-2}$ polymers. A unit of measure termed the hydrogen deficiency index, hereinafter referred to as the "HDI," has proven a practical means for characterizing a particular tetramer fraction with regard to this factor. The "HDI" of a particular tetramer fraction is determined from low voltage mass spectrometry readings by taking a simple ratio of the isotope corrected peak heights shown for $C_nH_{2n}$ and $C_nH_{2n-2}$ compounds according to the formula:

$$HDI = [C_nH_{2n-2} + C_nH_{2n} + C_nH_{2n-2}] \times 100$$

The HDI of an olefin feedstock to an $AlCl_3$ catalyzed alkylation reaction has been found to be directly related to the catalyst consumption therein.

By the process of this invention an alkylation tetramer feed can be prepared which has a low HDI and correspondingly results in a considerable saving of catalyst in the alkylation reaction. Furthermore, by preventing the formation of hydrogen deficient polymers during the polymerization reaction the total tetramer yield is higher than that realized from hydrogenating the tetramer after polymerization. A phosphoric acid polymerization catalyst is not a hydrogenation catalyst and, therefore, does not promote hydrogenation of the product by the $H_2$ present in the reaction zone.

EXAMPLE 1

Various tetramer fractions are analyzed by low voltage mass spectrometry to determine the HDI for each fraction. The tetramer fractions are then alkylated with benzene in a conventional alkylation reaction as hereinbefore described. The amount of catalyst required for each fraction based on weight of tetramer is ascertained. The results obtained and the conditions of alkylation are set forth in Table I.

*Table I*

EFFECT OF HDI ON CATALYST CONSUMPTION

| | | | |
|---|---|---|---|
| Pressure, p.s.i.g | 800 | 800 | 800 |
| Temperature, °F | 360 | 350 | 350 |
| Tetramer HDI | 7 | 11.3 | 13.9 |
| Wt. percent of $AlCl^3$ consumption | 2.6 | 3.4 | 3.9 |
| Percent increase | | 30.0 | 50.0 |

EXAMPLE 2

To determine the effect of introducing hydrogen gas directly into a tetramer producing polymerization reaction tests were conducted both with and without hydrogen. The propane diluted propylene comprising feedstock was the same in all tests. In each case the propylene feedstock was diluted with propane prior to polymerization in a propane to propylene ratio of about 2:1. The polymerization catalyst employed in each test was a solid type phosphoric acid catalyst, i.e. kieselguhr impregnated with a phosphoric acid mixture having the following typical composition:

| | Wt. Percent |
|---|---|
| $P_2O_5$ | 62 |
| $SiO_2$ | 32 |
| $H_2O$ | 7 |
| Free $P_2O_5$ | 14–18 |

In the tests employing hydrogen the hydrogen was introduced into the reaction at a rate of 0.6 mole of $H_2$ per mole of propylene. The conditions and results of these tests are given in Table II.

*Table II*

PROPYLENE POLYMERIZATION WITH AND WITHOUT HYDROGEN INTRODUCTION

| Run Number | 1 | 2 | 3 |
|---|---|---|---|
| Pressure, p.s.i.g | 800 | 800 | 800 |
| Temperature, °F | 350 | 450 | 495 |
| Space Velocity, g.p.h./l hr.[1] | 0.10 | 0.10 | 0.10 |
| Conversion, wt. percent | 79.9 | 79.8 | 79.1 |
| Without $H_2$: | | | |
| Tetramer Analysis, L.V. percent— | | | |
| $C_nH_{2n}$ | 93.2 | 83.1 | 77.9 |
| $C_nH_{2n-2}$ | 6.2 | 14.1 | 17.6 |
| $C_nH_{2n-4}$ | 0.6 | 2.1 | 3.1 |
| $C_nH_{2n-6}$ | 0.0 | 0.7 | 1.4 |
| Tetramer HDI | 10.0 | 20.0 | 31.2 |
| Catalyst Requirement for Alkylating Tetramer and Benzene— | | | |
| Wt. percent $AlCl_3$ Consumption [2] | 3.2 | 5.0 | 7.0 |
| With $H_2$: | | | |
| Tetramer Analysis, L.V. percent— | | | |
| $C_nH_{2n}$ | 95.2 | 89.7 | 82.3 |
| $C_nH_{2n-2}$ | 4.6 | 8.5 | 13.6 |
| $C_nH_{2n-4}$ | 0.2 | 1.0 | 1.9 |
| $C_nH_{2n-6}$ | 0.0 | 0.8 | 2.2 |
| Tetramer HDI | 8.2 | 14.0 | 22.7 |
| Catalyst Requirement for Alkylating Tetramer and Benzene— | | | |
| Wt. percent $AlCl_3$ consumption [2] | 2.8 | 3.9 | 5.2 |

[1] G.p.h./lb. = U.S. gallon per hour/pound of catalyst.
[2] Based on weight of tetramer feed.

The invention may be more easily understood by referring to the accompanying drawing which sets forth a simplified flow plan for carying out one embodiment of this invention.

EXAMPLE 3

A propylene-propane comprising stream is introduced via line 1, passed through preheater 2 maintained at a temperature of about 320°–450° F. into reactor B. $H_2$ gas from line 3 which may be combined with $H_2$, propane and unreacted propylene recycle from line 6 is passed through preheater 4 directly into reactor B. Reactor B contains a U.O.P. solid type phosphoric acid catalyst containing about 62 wt. percent of $P_2O_5$ and is maintained at a temperature of about 320°–450° F. under a pressure of about 300–1000 p.s.i.g. The space velocity is maintained at about 0.1 g.p.h./lb. The entire effluent from reactor B is removed via line 5 from whence it passes to flash drum C where most of the propane, hydrogen and unreacted propylene in the stream are flashed off and recycled to line 3 via line 6. From C the polymer-rich effluent is removed via line 7 and passed to depropanizer D where the remaining gaseous components are separated from the liquid polymer and vented via line 8 or recycled to line 1 via lines 8 and 10. The liquid polymer effluent from D is removed via line 9 and passed to first fractionating zone E where it is separated into two streams. The light polymer $C_5$–$C_{11}$ is taken overhead through 10 and may be blended into gasoline or recycled back into polymerization reactor B via lines 10 and 1. The $C_{12}$ rich fraction is removed from E via line 11 and passed to second fractionator F where a tetramer fraction of the desired boiling range is taken overhead via line 12 and passed to the alkylation unit. High boiling bottoms are removed from F via line 13.

It is to be understood that various modifications of the process flow pattern may be made which fall within the scope of the invention as claimed. For example, the material recycled via lines 6, 8 and 10 may be introduced directly into reactor B.

The tetramer fraction removed is alkylated with benzene at a temperature of about 55° F. and a pressure of about 20 p.s.i.g. employing $AlCl_3$ catalyst. The amount of $AlCl_3$ used up in effecting this alkylation is found to be 2 to 3 wt. percent based on total polymer fed to the alkylation reaction.

The above conditions represent preferred conditions and may be altered slightly to suit the needs of any particular plant design. For further detailed and general information as to the alkylation process per se reference may be had to the patent issued to W. J. Paltz, U.S. 2,667,519.

The term "g.p.h." used herein refers to gallons per hour.
The term "s.c.f." used herein refers to standard cubic feet.

What is claimed is:

1. In a process for producing a $C_9$ to $C_{24}$ olefin by a polymerization of propylene which comprises introducing a propylene feedstock comprising at least 85 wt. percent propane and propylene in a molar ratio of between 0.5–4:1 into a reaction zone containing a solid phosphoric acid polymerization catalyst and maintained at a temperature in the range of 200° to 600° F. at a pressure in the range of 500 to 800 p.s.i.g. and recovering said olefin as product therefrom, the improvement which comprises maintaining in said reaction zone during such polymerization about 0.3 to 0.7 mole of hydrogen per mole of propylene, the olefin recovered from the improved process having a lower HDI than the olefin recovered from the unimproved process.

2. A process in accordance with claim 1 wherein said olefin is a $C_{12}$ to $C_{15}$ olefin.

3. A process in accordance with claim 1 wherein said temperature is in the range of 300° to 450° F.

4. A process for producing a $C_9$ to $C_{24}$ olefin which comprises simultaneously introducing a propylene comprising feedstock consisting essentially of propylene and propane and about 0.3 to 0.7 mole of hydrogen gas per mole of propylene in said feedstock into a reaction zone containing a solid phosphoric acid polymerization catalyst maintained at a temperature in the range of 300° to 450° F. and a pressure of 500 to 800 p.s.i.g., and recovering said olefin, the olefin recovered from the improved process having a lower HDI than the olefin recovered from the unimproved process.

5. A process in accordance with claim 4 wherein said olefin is a $C_{12}$ to $C_{15}$ olefin.

6. A process in accordance with claim 4 wherein the mole ratio of said propane to said propylene is in the range of 0.5–4:1.

7. A process in accordance with claim 4 wherein said catalyst is phosphoric acid on kieselguhr.

8. A process for producing an olefin polymer boiling in the range of 365° to 430° which comprises simultaneously introducing an olefin containing feedstock consisting essentially of propane and propylene and about 0.3 to 0.7 mole of hydrogen gas per mole of propylene in said feedstock into a reaction zone containing a solid phosphoric acid polymerization catalyst at a temperature in the range of 320° to 400° F. under a pressure of 500 to 800 p.s.i.g. at a rate of about 0.1 to 0.5 gallon per hour per pound of said catalyst and recovering from said zone said olefin polymer, the olefin polymer recovered from the improved process having a lower HDI than the olefin polymer recovered from the unimproved process.

9. A process in accordance with claim 8 wherein said catalyst consists essentially of phosphoric acid on kieselguhr.

10. In a process of alkylating benzene by the reaction of a $C_9$–$C_{24}$ olefin with benzene in the presence of aluminum chloride catalyst wherein said olefin is a polymerization product prepared by introducing a propylene feedstock comprising at least 85 wt. percent propane and propylene in a molar ratio of between 0.5–4:1 into a reactor containing a solid phosphoric acid polymerization catalyst maintained at a temperature in the range of 200° to 600° F. and a pressure of 500 to 800 p.s.i.g. and recovering said olefin therefrom, the improvement which comprises introducing into said reactor during said polymerization 0.3 to 0.7 mole of hydrogen gas per mole of said propylene, recovering said olefin from said reactor and employing said olefin to prepare alkyl benzene in the presence of aluminum chloride catalyst, the olefin recovered from the improved process having a lower HDI than the olefin recovered from the unimproved process.

11. A process in accordance with claim 10 wherein said temperature is in the range of 320° to 400° F.

12. A process in accordance with claim 8 wherein a light olefin polymer produced in said polymerization reaction is recycled to said reaction zone, said light olefin polymer containing less than 12 carbon atoms.

References Cited in the file of this patent

UNITED STATES PATENTS

| | | |
|---|---|---|
| 2,446,619 | Stewart et al. | Aug. 10, 1948 |
| 2,477,382 | Lewis | July 26, 1949 |
| 2,786,878 | Arundale et al. | Mar. 26, 1957 |